(12) United States Patent
Chantrain et al.

(10) Patent No.: US 6,944,664 B1
(45) Date of Patent: Sep. 13, 2005

(54) METHOD FOR CONNECTING A FIRST USER-TERMINAL TO A SECOND USING-TERMINAL, RELATED DEVICES AND RELATED SOFTWARE MODULES

(75) Inventors: Dominique Helena Lucia Chantrain, Edegem (BE); Stéphane Focant, Elsene (BE); Nick Marly, Ghent (BE)

(73) Assignee: Alcatel, Paris (FR)

( * ) Notice: Subject to any disclaimer, the term of this patent is extended or adjusted under 35 U.S.C. 154(b) by 679 days.

(21) Appl. No.: 09/666,388

(22) Filed: Sep. 20, 2000

(30) Foreign Application Priority Data

Oct. 14, 1999 (EP) ................................. 99402536

(51) Int. Cl.$^7$ .............................................. G06F 15/16
(52) U.S. Cl. ...................... 709/227; 709/228; 709/230; 709/249
(58) Field of Search ................................ 713/169, 201; 709/202, 203, 229, 217, 227, 230, 249; 370/256, 370/331, 389

(56) References Cited

U.S. PATENT DOCUMENTS

| | | | | |
|---|---|---|---|---|
| 5,870,386 | A | * 2/1999 | Perlman et al. | 370/256 |
| 5,918,019 | A | * 6/1999 | Valencia | 709/227 |
| 6,061,796 | A | * 5/2000 | Chen et al. | 713/201 |
| 6,081,900 | A | * 6/2000 | Subramaniam et al. | 713/201 |
| 6,233,232 | B1 | * 5/2001 | Chau et al. | 370/352 |
| 6,298,383 | B1 | * 10/2001 | Gutman et al. | 709/229 |
| 6,308,213 | B1 | * 10/2001 | Valencia | 709/229 |

(Continued)

FOREIGN PATENT DOCUMENTS

WO   WO 98/05146   2/1998

(Continued)

OTHER PUBLICATIONS

Bryan Gleeson, et al.: "A Framework for IP Based Virtual Private Networks", Feb. 1999, by the Internet Engineering Task Force (IETF).

(Continued)

*Primary Examiner*—Ayaz Sheikh
*Assistant Examiner*—Christian La Forgia
(74) *Attorney, Agent, or Firm*—Sughrue Mion, PLLC (57) ABSTRACT

A method and related apparatus for connecting first and second user-terminals to one another over a network (e.g., the internet) containing a plurality of user-terminals and a plurality of respective network access servers. When the second user-terminal connects to its respective network access server, this network access server sends connection information to the subscriber data server which updates its database with this connection information. The subscriber data server handles an incoming call request, from a first user-terminal connected to a first virtual private network, to establish a connection between the first user-terminal and the second user-terminal that is connected to a second virtual private network. The subscriber data server at first searches in its database for connection information of the second user-terminal and then determines the respective network access server that is connected to the second user-terminal based on the determined connection information. Then the second user-terminal is notified about the request for communication by the first user-terminal, and then initiates and controls a switch-over of the connection of the second user-terminal from the second virtual private network to the first virtual private network. The respective network access server of the second user-terminal switches the connection of the second user-terminal from the second virtual private network to the first virtual private network. Then at the switch-over of the connection of the second user-terminal from the second virtual private network to the first virtual private network there is also connection information sent by the adjacent respective network access server to the subscriber data server.

14 Claims, 3 Drawing Sheets

U.S. PATENT DOCUMENTS

| | | | |
|---|---|---|---|
| 6,381,631 B1 * | 4/2002 | van Hoff | 709/202 |
| 6,434,700 B1 * | 8/2002 | Alonso et al. | 713/169 |
| 6,449,272 B1 * | 9/2002 | Chuah et al. | 370/389 |
| 6,470,453 B1 * | 10/2002 | Vilhuber | 713/201 |
| 6,487,598 B1 * | 11/2002 | Valencia | 709/227 |
| 6,496,491 B2 * | 12/2002 | Chuah et al. | 370/331 |
| 6,539,482 B1 * | 3/2003 | Blanco et al. | 713/201 |

FOREIGN PATENT DOCUMENTS

| | | |
|---|---|---|
| WO | WO 98/59467 | 12/1998 |
| WO | WO 98/59470 | 12/1998 |

OTHER PUBLICATIONS

"Virtual Lans get real ethernet switch makers are taking the lead in deploying virtual lans across campus networks" Data Communications, US, McGraw Hill, New York, vol. 24, No. 3, Mar. 1, 1995, pp. 87-92, 94, 96, XP000496027, ISSN: 0363-6399.

* cited by examiner

FIG.1: INW

FIG.2: NAS1

FIG.3: SDS

FIG.4: UT2

FIG.5: NAS2

METHOD FOR CONNECTING A FIRST USER-TERMINAL TO A SECOND USING-TERMINAL, RELATED DEVICES AND RELATED SOFTWARE MODULES

BACKGROUND OF THE INVENTION

The present invention relates to a method for connecting user terminals to one another over a network containing a plurality of user-terminals and a respective plurality of network access servers, and also relates to a network access server and subscriber data service for implementing such a method. The invention further relates to a user terminal included in such a network, and to software running on the processing systems in the subscriber data service or the user terminal for implementing the method.

Such a method for connecting a first user-terminal to a second user-terminal is already known in the art, e.g. from the internet draft document *"A FRAMEWORK FOR IP BASED VIRTUAL PRIVATE NETWORKS"* from the authors Bryan Gleeson et al, published in February 1999 by the Internet Engineering Task Force (IETF). Therein, a virtual private network is constituted by configuring all network access server access links, called stub-links in the referred draft, with the identity of the particular virtual private network whereto the access link of the network access server belongs.

In this way each user-terminal is assigned to a particular virtual private network in a static way. Each of the user-terminals assigned to a common virtual private network are able to establish a communication with any other user-terminal assigned to the same virtual private network because information on the address of each connected user-terminal, called reachability information is available within the virtual private network.

At the moment there is a first user-terminal being assigned to a first virtual private network willing to establish a communication with a second user-terminal being assigned to a second virtual private network there is no way of connecting both user-terminals in order to establish a communication because there is no information available on the address of the second assigned to the second virtual private network.

An object of the present invention is to provide a method of the above known type, a system, a network access server, a subscriber data server and a second user-terminal adapted to perform this method, but wherein access from a first user-terminal connected to a first virtual private network is able to connect to a second user-terminal connected to a second virtual private network.

According to the invention, this object is achieved by a method for connecting a first and second user terminals to one another over a network (e.g., the internet) containing a respective plurality of network access servers, characterised in that a subscriber data server is added to the network and that the necessary connection information is made available enabling determination of the location of the second (i.e., to be connected) user-terminal. The subscriber data server is able to store and retrieve information as to which network access server the second user-terminal is connected to and the virtual private network the second user-terminal forms part of. At a connection request from a user-terminal forming part of a different virtual private network, the subscriber data server retrieves the connection information about the second user-terminal in order to locate this user-terminal. Subsequently, the subscriber data server forwards a connection request to the located second user-terminal. The second user-terminal in its turn decides on accepting the incoming call. If the incoming call is accepted, the second user-terminal forwards a request to the network access server it is connected to, to switch its connection from its current virtual private network to the first virtual private network. At the moment the switch is performed, both user-terminals form part of the same virtual private network. Then they are able to establish a communication because address information of the second user-terminal is available and accessible for the first user-terminal in this context.

The invention further resides in a network access server, subscriber data server and second user terminal configured to perform the above-described method.

Another characteristic feature of the present invention is that the connection request of the first user-terminal may be sent from.

SUMMARY OF THE INVENTION

The connection request of the first user-terminal may be sent from the subscriber data server to the second user-terminal via the network access server where this network access server in a active way forwards the connection request received from the subscriber data server to the second user-terminal. On the other hand the connection request may be passed, over a transparent connection between the subscriber data server and the second user-terminal via the network access server. These are alternative solution for the transfer of the connection request between the subscriber data server and the second user-terminal.

In accordance with a further aspect of the invention, the connection request of the first user-terminal may be sent from request received from first user-terminal to the subscriber data server. On the other hand the connection request may be passed, as described in claim 5, over a transparent connection between the first user-terminal and the subscriber data server via the network access server connected to the first user-terminal. These are alternative solution for the transfer of the connection request between the first user-ter in and the subscriber data server.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
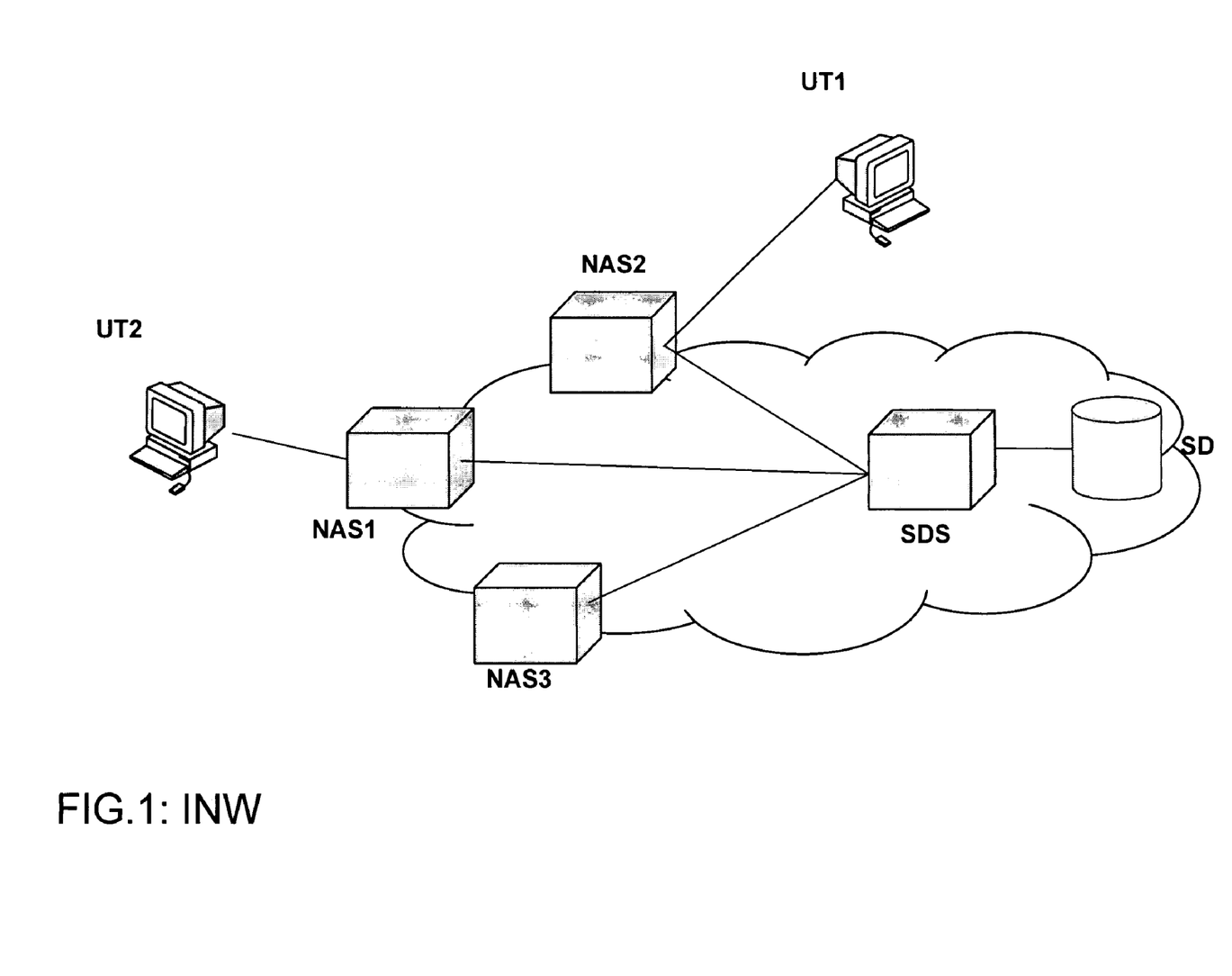
FIG. 1 represents an internet network INW wherein the implementation of the present invention is realised.

In the following paragraphs, referring to the drawings, an implementation of the method and the related devices according to the present invention will be described. In the first paragraph of this description the main elements of this network as presented in FIG. 1 are described. In the second paragraph, all connections between the before mentioned network elements and described means are defined. In the succeeding paragraph the actual execution of the method for connecting a first user-terminal to a second user-terminal is described.

An essential element of this embodiment of the present invention is a network constituted by the internet network INW. Further there is a number of user-terminals, but in order to keep simplicity in this description only two user-terminals UT1, UT2 are presented. Both user-terminals UT1 and UT2 are chosen to be a personal computer with a belonging screen and keyboard. Additionally there is a number of access nodes connecting each of the user-terminals to the internet network INW and taking care of subscription of the connected user-terminals to a virtual private network. Concerning these access nodes, also because of reasons of simplicity only three access nodes NAS1, NAS2 and NAS3 are described and presented in FIG. 1. These access nodes NAS1, NAS2 and NAS3 are chosen to be network access servers.

User-terminal UT2 is connected to network access server NAS1 via an Internet protocol link, further referred to as an IP-link. User-terminal UT1 is connected to network access server NAS2 via an IP-link. The network access servers NAS1, NAS2 and NAS3 each constitute the edge of the internet network INW and are all interconnected via the internet network. The subscriber data server SDS is connected to each of the network access servers NAS1, NAS2 and NAS3 over an IP-link.

Figure 2:
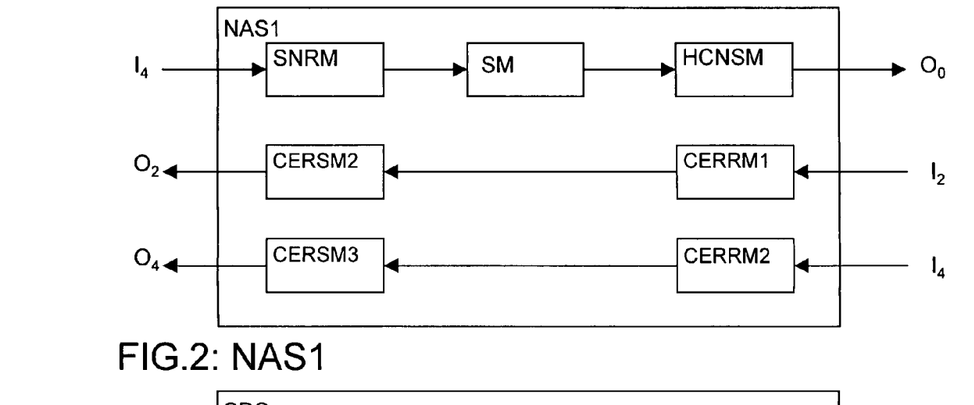
FIG. 2 represents the network access sever NAS1 of FIG. 1.

The network access node NAS1 as presented in FIG. 2. is built up of the switch notification reception means SNRM, that is able to receive a request from the second user-terminal UT2 to initiate a switch-over of the connection of the second user-terminal UT2 from a second virtual private network to a first virtual private network, the switching means SM that is adapted to perform the switch of the connection of the second user-terminal from a second virtual private network to a first virtual private network and a user-terminal connect notification sending means HCNSM that is adapted to send registration information to the subscriber data server at connecting or changing of the subscribed virtual private network of the second user-terminal to the respective network access server NAS1.

The switch notification reception means SNRM has an input-terminal that is at the same time also an input-terminal 14 of network access server NAS1. The switch notification reception means SNRM further is coupled to the switching means SM which in its turn is coupled to the user-terminal connect notification sending means HCNSM, that has an output-terminal which at the same time is an output-terminal $O_0$ of the network access server NAS1.

This network access server NAS1 optionally has the following means. At first there is a connection establishment request reception means CERRM1 that is adapted to receive a connection request from the subscriber data server to establish a connection between the first user-terminal UT1 connected to a first virtual private network and the second user-terminal UT2 connected to a second virtual private network. Further there is a connection establishment request sending means CERSM1 that is able to notify the second user-terminal UT2 about an incoming call from the first user-terminal UT1.

The connection establishment request reception means CERRM1 has an input-terminal that at the same time is an input-terminal 12 of the network access server NAS1. The connection establishment request reception means CERRM1 in its turn is coupled to the connection establishment request sending means CERSM2 that subsequently has an output-terminal that is at the same time an output-terminal $O_2$ of the network access server NAS1.

Besides these means the network access node NAS1 as presented in FIG. 2. may also comprise a connection establishment request reception means CERRM2, that is adapted to receive a connection request from the second user-terminal to establish a connection between the second user-terminal connected to the second virtual private network and the first user-terminal connected to a first virtual private network and a belonging connection establishment request sending means CERSM3, that is adapted to notify the subscriber data server about an incoming call from the second user-terminal.

The connection establishment request reception means CERRM2 has an input-terminal that at the same time is an input-terminal 14 of the network access server NAS1. The connection establishment request reception means CERRM2 in its turn is coupled to the connection establishment request sending means CERSM3 that subsequently has an output-terminal that is at the same time an output-terminal 04 of the network access server NAS1. These latest mentioned means optionally are to be included in a network access server and excluding all other, previously mentioned means.

Network access server NAS2 and Network access server NAS3 have the same structure as the Network access server NAS1 as previously described.

Figure 3:
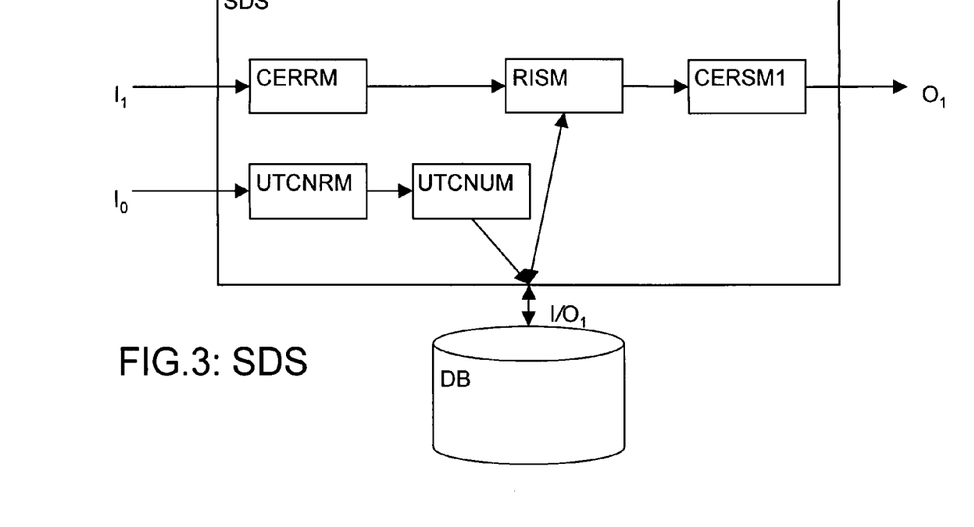
FIG. 3 represents the subscriber data server SDS of FIG. 1.

The Subscriber Data Server SDS as presented in FIG. 3 is built-up of the user-terminal connect notification reception means UTCNRM that is able to receive the connection information sent at connecting of the second user-terminal UT2 to network access server NAS1 or at switching a connection from one virtual private network to another. The user-terminal connect notification updating means UTCNUM is adapted to update the database DB of the subscriber data server with the connection information. Further there is a connection establishment request reception means CERRM that is able to receive a connection request from the first user-terminal UT1 to establish a connection between the first user-terminal connected to a first virtual private network and the second user-terminal connected to a second virtual private network. The registration information searching means RISM is adapted to search in the database DB of the subscriber data server SDS for recent registration information of the second user-terminal UT2, and the connection establishment request sending means CERSM1, that is adapted to notify the second user-terminal about an incoming call from a first user-terminal.

The user-terminal connect notification reception means UTCNRM has an input-terminal that is at the same time an input-terminal I/O of the subscriber data server SDS. This user-terminal connect notification updating means UTCNRM is coupled to the user-terminal connect notification updating means UTCNUM which also has an output-terminal that is at the same time is an input/output-terminal $I/O_1$ of the subscriber data server SDS.

The connection establishment request reception means CERRM has an input-terminal that is at the same time an input-terminal $I_1$ of the subscriber data server SDS and is coupled to the registration information searching means RISM. This registration information searching means RISM, has an input-terminal that at the same time is an input/output-terminal $I/O_1$ of the subscriber data server SDS and further is coupled to the connection establishment request sending means CERSM1. The connection establishment request sending means CERSM1 has an output-terminal that is at the same time an output-terminal $O_1$ of the subscriber data server SDS.

Figure 4:
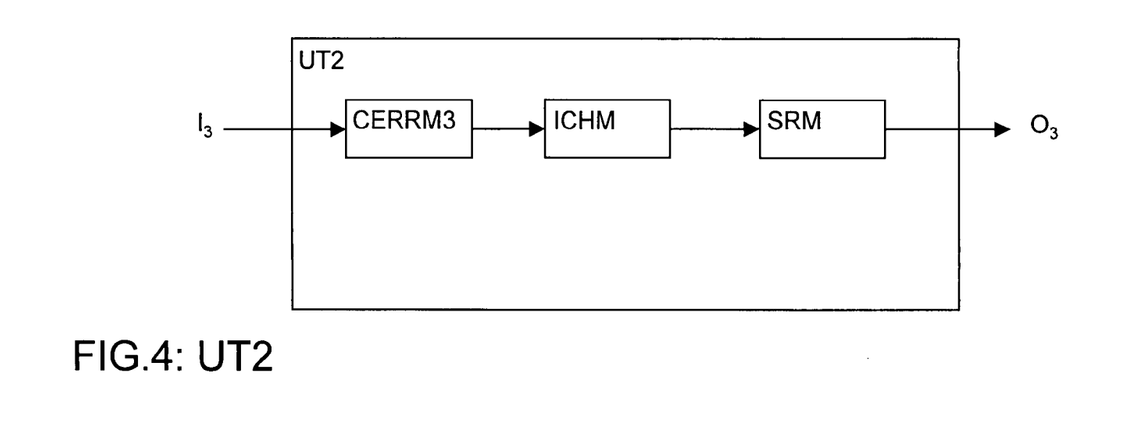
FIG. 4 represents the second user-terminal UT2 of FIG. 1.

The second user-terminal UT2 as presented in FIG. 4 is built-up of the connection establishment request reception means CERRM3, which is able to receive a connection request from the subscriber data server SDS to establish a connection between the first and the second user-terminal, and an incoming call handling means ICHM that is adapted to handle the connection request from the first user-terminal. At last there is a switch requesting means SRM that is adapted to request the respective network access server to switch the connection of the second user-terminal UT2 from the second virtual private network to the first virtual private network.

The connection establishment request reception means CERRM3 has an input-terminal that is at the same time an input-terminal $I_3$ of this second user-terminal UT2. Further, the connection establishment request reception means CERRM3 is coupled to the incoming call handling means ICHM, that in its turn is coupled to the switch requesting means SRM. The switch requesting means SRM has an output-terminal that is coupled to an output-terminal $O_3$ of the second user-terminal UT2.

Figure 5:
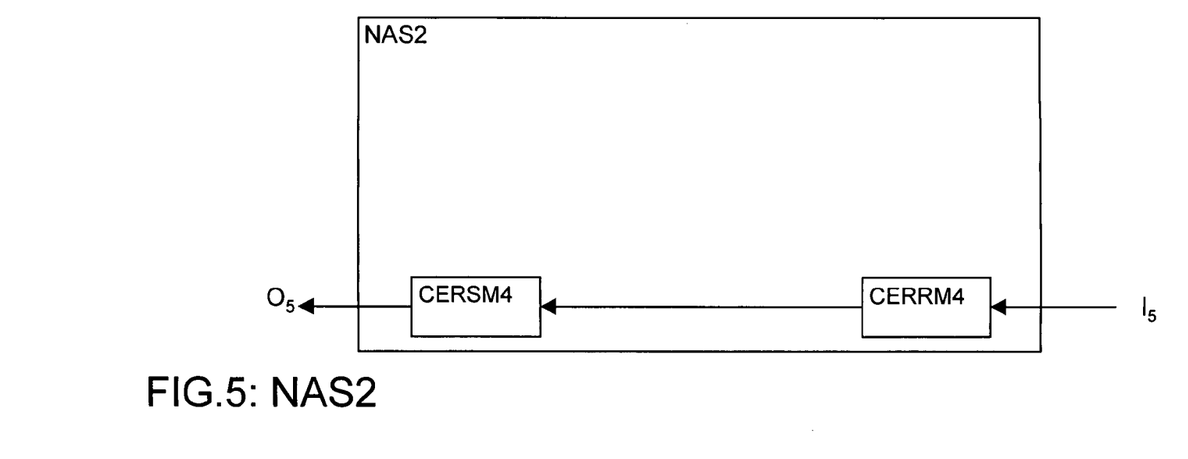
FIG. 5 represents the network access server NAS2 of FIG. 1.

The network access server NAS2 as presented in FIG. 5 may alternatively being built up of a connection establishment request reception means CERRM4 that is adapted to receive a connection request from the first user-terminal UT1 to establish a connection between the first user-terminal UT1 that is connected to the first virtual private network and the second user-terminal UT2 that is connected to the second virtual private network and further a connection establishment request sending means CERSM4 that is adapted to notify the subscriber data server SDS about an incoming call from the first user-terminal UT1.

The connection establishment request reception means CERRM4 has an input-terminal that at the same time is an input-terminal $I_5$ of the network access server NAS2. The connection establishment request reception means CERRM4 in its turn is coupled to the connection establishment request sending means CERSM4 that subsequently has an output-terminal that is at the same time an output-terminal $O_5$ of the network access server NAS2.

In order to explain the actual operation of the present invention it is assumed that a second user-terminal UT2 is connected to network access server NAS1 and is connected to a second virtual private network. It is further assumed that another user-terminal, a first user-terminal UT1 connected to network access server NAS2 and forms part of a first virtual private network tries to contact the second user-terminal UT2.

According procedures that are well known in the art by the persons skilled in the art and therefor not described, the first user-terminal UT1 tries to obtain the Internet address, further referred to as the IP-address, of the to be contacted second user-terminal UT2.

Because both user-terminals are not connected to the same virtual private network it is not possible to connect both user-terminals. The first user-terminal will request the subscriber data server SDS for a connection to this second user-terminal by sending the connection request over a transparent connection between the first user-terminal and the subscriber data server via the network access server NAS2.

Alternatively the connection request can be sent to a connection establishment request reception means of network access sever NAS2 that receives this connection request from the first user-terminal to establish a connection between the first user-terminal connected to a first virtual private network and the second user-terminal connected to the second virtual private network. Subsequently the connection establishment request sending means of network access sever NAS2 notifies the subscriber data server about an incoming call from the first user-terminal.

This may also be performed by the connection establishment request reception means CERRM4 of NAS2 that receives this connection request from the first user-terminal UT1 to establish a connection between the first user-terminal connected to a first virtual private network and the second user-terminal connected to the second virtual private network. Subsequently the connection establishment request sending means CERSM4 notifies the subscriber data server about an incoming call from the first user-terminal.

The connection establishment request reception means CERRM of the subscriber data server SDS receives this connection request from the first user-terminal. Subsequently the registration information searching means RISM starts searching in the belonging database DB of the subscriber data server SDS for connection information of this second user-terminal UT2.

The user-terminal connect notification sending means HCNSM sends connection information to the user-terminal connect notification reception means UTCNRM of the subscriber data server SDS at connecting of the second user-terminal to the respective network access server NAS1 or at switch-over to another virtual private network. The user-terminal connect notification reception means UTCNRM of the subscriber data server SDS receives this registration and forwards it to the user-terminal connect notification updating means UTCNUM that updates the database DB of the subscriber data server SDS with the recently received connection information. This registration information contains information to which network access server a user-terminal is connected and which virtual private network that user-terminal forms part of. There is also a list maintained for each user on which virtual private network the user has a subscription on.

The connection information searching means RISM then retrieves the connection information of the second user-terminal UT2. This connection information contains the information that the user of second user-terminal UT2 amongst others has also a subscription to the first virtual private network and that this second user-terminal UT2 is connected to network access server NAS1 and that it currently is connected to the second virtual private network. Using this information, the connection establishment request sending means CERSM1 will notify the second user-terminal UT2 about an incoming call from the first user-terminal UT1 via a transparent connection between the subscriber data server SDS and the second user-terminal UT2 via network access server NAS1.

The notification of the second user-terminal UT2 about an incoming call from the first user-terminal UT1 may alternatively be done by sending the incoming call notification to the connection establishment request reception means CERRM1 that receives a connection request from the subscriber data server to establish the connection between the first user-terminal connected to the first virtual private network and the second user-terminal connected to the second virtual private network via the network access server. Subsequently the connection establishment request sending means CERSM2 notifies the second user-terminal about an incoming call from the first user-terminal.

The connection establishment request reception means CERRM3 of the second user-terminal receives the connection request sent by subscriber data server SDS and subsequently forwards this notification to the incoming call handling means ICHM that handles this connection request from the first user-terminal by, assume a pop-up screen requesting the user of the second user-terminal UT2 to accept an incoming call from this first user-terminal and postpone or finish the ongoing communication. If the user decides to accept the incoming call from the first user-terminal the current communication is finished and the switch requesting means SRM, of the second user-terminal requests the network access server NAS1 to switch the connection of the second user-terminal from the second virtual private network to the first virtual private network. The switch notification reception means SNRM, receives the request from the second user-terminal to initiate a switchover of the connection of the second user-terminal from the second virtual private network to the first virtual private network and forwards it to the switching means SM that finally performs the switch. At that time both the second and the first user-terminal form part of the same private network.

This means that the communication between the first user-terminal and the second user-terminal further can be established according to the previously mentioned procedures that are well known by persons skilled in the art.

The user-terminal connect notification sending means HCNSM further sends the updated registration information to the subscriber data server at connecting of said second user-terminal to the first virtual private network.

It is further to be remarked that any other communications network could have been described in this embodiment.

Another further remark is that the network as described in the previous embodiment may act as a sub-network of large network consisting of a number of these networks. In this way the network consists of a number of distributed subscriber data servers co-operating in order to perform the method as described for any of the sub-networks.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. A method for connecting a first user terminal of a first virtual private network to a second user terminal of a second virtual private network, over a network, said network having a plurality of user terminals and a plurality of network access servers, each of said plurality of user terminals being coupled to a respective network access server of said plurality of network access servers, comprising:
   a. making a connection of said second user terminal to a first network access server, wherein said first network access server is said respective network access server of said second user terminal;
   b. in response to said connection of said second user terminal, sending connection information from said first network access server to a subscriber data server included in said network and coupled to each of said plurality of network access servers;
   c. updating a database of said subscriber data server based on said connection information;
   d. upon an incoming request of communication from said first user terminal to said second user terminal, said subscriber data server locating said respective network access server connected to said second user terminal and notifying said second user-terminal based on said request of communication from said first user-terminal; and
   e. switching said second user terminal from said second virtual private network to said first virtual private network in response to said locating.

2. The method according to claim 1, wherein:
   said incoming request of communication is an incoming call request from said first user-terminal and is handled by said subscriber data server;
   said locating includes searching in said database of said subscriber data server for connection information of said second user-terminal;
   said subscriber data server uses said connection information to determine said virtual private network and said respective network access server connected to said second user-terminal;
   said subscriber data server indicates said incoming call request to said respective network access server connected to said second user-terminal; and
   said respective network access server connected to said second user-terminal notifies said second user-terminal of said incoming call request.

3. The method according to claim 1, wherein said step of notifying said second user-terminal, based on said requesting of said communication from said first user-terminal, is performed over a transparent connection between said subscriber data server and said second user-terminal via said first network access server.

4. The method according to claim 1, further comprising, before said step d:
   receiving said incoming call request of said first user-terminal at said respective network access server connected to said first user-terminal; and
   said respective network access server connected to said first user-terminal sending said incoming call request of said first user-terminal to said subscriber data server.

5. The method according to claim 1, further comprising, before said step d, sending said incoming call request of said first user-terminal over a transparent connection between said first user-terminal and said subscriber data server via said network access server connected to said first user-terminal.

6. The method according to claim 1, wherein the step e further comprises:
   a. said second user terminal initiating and controlling a switch-over of said connection of said second user terminal from said second virtual private network to said first virtual private network;
   b. said first network access server switching said connection of said second user terminal from said second virtual private network to said first virtual private network; and
   c. upon switch-over of said connection of said second user terminal from said second virtual private network to said first virtual private network, sending connection information from said first network access server to said subscriber data server .

7. A network access server for enabling a connection over a network between two user terminals of two different virtual private networks, wherein each of said user terminals is coupled to a respective network access server, the network access server comprising:

switch notification reception means for receiving a request, from one of said user terminals, to initiate a switch-over of a connection from one of said virtual private networks to the other;

switching means, coupled with said switch notification reception means, for performing said switch-over of said connection; and user terminal connect notification sending means, coupled with said switching means, for sending connection information to a subscriber data server, upon the connecting of one of said user terminals to said network access server and upon said switch-over of said connection of one of said user terminals from the one of the virtual private networks to the other.

8. The network access server according to claim 7, further comprising:

connection establishment request reception means for receiving from said subscriber data server a connection request to establish said connection between said two user terminals; and connection establishment request sending means, coupled with said connection establishment requesting reception means, for notifying one of said user terminals about an incoming call from another of said user terminals.

9. A network access server according to claim 7, further comprising:

connection establishment request reception means for receiving from one of said user terminals a connection request to establish said connection between said two user terminals; and connection establishment request sending means, coupled with said connection establishment requesting reception means, for notifying said subscriber data server about an incoming call from the one of said user terminals.

10. A network access server, defined as a second network access server, intended for use in a network operating according to a method for connecting a first user terminal of a first virtual private network to a second user terminal of a second virtual private network, said network having a plurality of user terminals and a plurality of network access servers including said network access server, each of said plurality of user terminals being coupled to a respective network access server of said plurality of network access servers, the network operating method comprising:

a. making a connection of said second user terminal to a first network access server, wherein said first network access server is said respective network access server of said second user terminal;

b. in response to said connection of said second user terminal, sending connection information from said first network access server to a subscriber data server included in said network and coupled to each of said plurality of network access servers;

c. updating a database of said subscriber data server based on said connection information;

d. upon an incoming request of communication from said first user terminal to said second user terminal, said subscriber data server locating said respective network access server connected to said second user terminal and notifying said second user-terminal based on said request of communication from said first user-terminal; and e. switching said second user terminal from said second virtual private network to said first virtual private network in response to said locating;

wherein:

said incoming request of communication is an incoming call request from said first user-terminal and is handled by said subscriber data server;

said locating includes searching in said database of said subscriber data server for connection information of said second user-terminal;

said subscriber data server uses said connection information to determine said virtual private network and said network access server connected to said second user-terminal;

said subscriber data server indicates said incoming call request to said respective network access server connected to said second user-terminal;

said respective network access server connected to said second user-terminal notifies said second user-terminal of said incoming call request;

wherein said second network access server comprises:

connection establishment request reception means, adapted to receive a connection request from said first user-terminal to establish said connection between said first user-terminal connected to said first virtual private network and said second user-terminal connected to said second virtual private network; and connection establishment request sending means, coupled with an input to an output of said connection establishment requesting reception means and adapted to notify said subscriber data server about an incoming call from said first user-terminal.

11. A subscriber data server, intended for use in a network having user terminals communicating with respective network access servers, wherein the network access servers communicate with the subscriber data server, and wherein some of the user terminals are in different virtual private networks, the subscriber data server comprising:

a connection information database;

user terminal connect notification reception means, adapted to receive connection information upon the connection of one of the user terminals to one of the network access servers;

user terminal connect notification updating means, coupled with the user terminal connect notification reception means, for updating the connection information database based on the connection information;

connection establishment request reception means for receiving a connection request, from a first one of the user terminals a first one of the virtual private networks, to establish a connection with a second one of the user terminals in a second one of the virtual private networks;

connection information searching means, coupled with the connection establishment request reception means, for searching in the connection information database for the connection information of the second user terminal; and connection establishment request sending means, coupled with the connection information searching means, for notifying the second user terminal about an incoming call from said first user terminal, according to the connection information of the second user terminal.

12. A user terminal intended for use in a network having user terminals communicating with respective network access servers, wherein the network access servers communicate with a subscriber data server, and wherein some of the user terminals are in different virtual private networks, the user terminal comprising:

connection establishment request reception means for receiving, from the respective network access server of the user terminal, a connection request of a different user terminal from a different virtual private network to establish a connection to the user terminal;

incoming call handling means, coupled with the connection establishment request reception means, for handling the connection request from the different user terminal; and switch requesting means, coupled with the incoming call handling means, for requesting the respective network access server to switch the connection of the user terminal from a current virtual private network to the different virtual private network of the different user terminal.

13. A software module for running on a processing system for inclusion in a subscriber data server, intended for use in a network having user terminals communicating with respective network access servers, wherein the network access servers communicate with the subscriber data server, and wherein some of the user terminals are in different virtual private networks, the software module comprising:

a user terminal connect notification reception sub-module, adapted to receive connection information, upon connection of any of the user terminals to any one of the network access servers;

a user terminal connect notification updating sub-module, cooperating with the user terminal connect notification reception sub-module, and adapted to update a connection information database based on the connection information;

a connection establishment request reception sub-module, adapted to receive a connection request from a first one of the user terminals of one of the virtual private networks, to establish a connection with a second one of the user terminals of a different one of the virtual private networks;

a connection information searching sub-module, cooperating with the connection establishment request reception sub-module, and adapted to search the connection information database for connection information of the second user terminal; and a connection establishment request sending sub-module, cooperating with the connection information searching sub-module, and adapted to notify the second user terminal about the incoming call from the first user terminal.

14. A software module intended for use in a given user terminal of a network having user terminals communicating with respective network access servers, wherein the network access servers communicate with a subscriber data server, and wherein some of the user terminals are in different virtual private networks, the software module comprising:

a connection establishment request reception sub-module, adapted to receive from the respective network access server a connection request, of a different user terminal, to establish a connection to the given user terminal;

an incoming call handling sub-module, cooperating with the connection establishment request reception sub-module, and adapted to handle the connection request; and a switch requesting sub-module, cooperating with the incoming call handling sub-module, and adapted to request the respective network access server of the given user terminal to switch the connection of the given user terminal from a current virtual private network to the different virtual private network of the different user terminal.

* * * * *